United States Patent [19]
Doutt

[11] Patent Number: 5,698,117
[45] Date of Patent: Dec. 16, 1997

[54] SHUT OFF VALVE SYSTEM FOR ROBOTIC WELDING DEVICES

[76] Inventor: Kingsley Doutt, P.O. Box 888, Alpena, Mich. 49707

[21] Appl. No.: 533,260

[22] Filed: Sep. 25, 1995

[51] Int. Cl.[6] .......................... B23K 37/02; F16K 31/12
[52] U.S. Cl. .......................... 219/86.31; 137/488
[58] Field of Search ...................... 219/86.22, 86.31, 219/120; 137/334, 339, 341, 485, 488

[56] References Cited

U.S. PATENT DOCUMENTS

| | | | |
|---|---|---|---|
| 1,775,773 | 9/1930 | McGuire | 200/277 |
| 3,431,375 | 3/1969 | Hotchkiss | 200/81 |
| 4,260,868 | 4/1981 | Day | 219/86.31 |
| 4,337,789 | 7/1982 | Lonardo | 137/340 |
| 4,481,971 | 11/1984 | Farrell et al. | 137/315 |
| 4,650,152 | 3/1987 | Doutt | 251/16 |
| 4,880,032 | 11/1989 | Doutt | 137/625.19 |
| 5,378,868 | 1/1995 | Burkhardt et al. | 219/86.31 |

*Primary Examiner*—Matthew V. Nguyen
*Attorney, Agent, or Firm*—Harpman & Harpman

[57] ABSTRACT

A sensor and valving system for controlling the flow of liquid coolant in a welding electrode cooling circuit using coolant under pressure in supply and return lines. The system is responsive to loss of coolant to the welding electrodes by pressure response upon loss of coolant detection, the coolant supply is cut off and effective lines are isolated allowing for repair or replaceable without additional loss of coolant from the system.

15 Claims, 3 Drawing Sheets

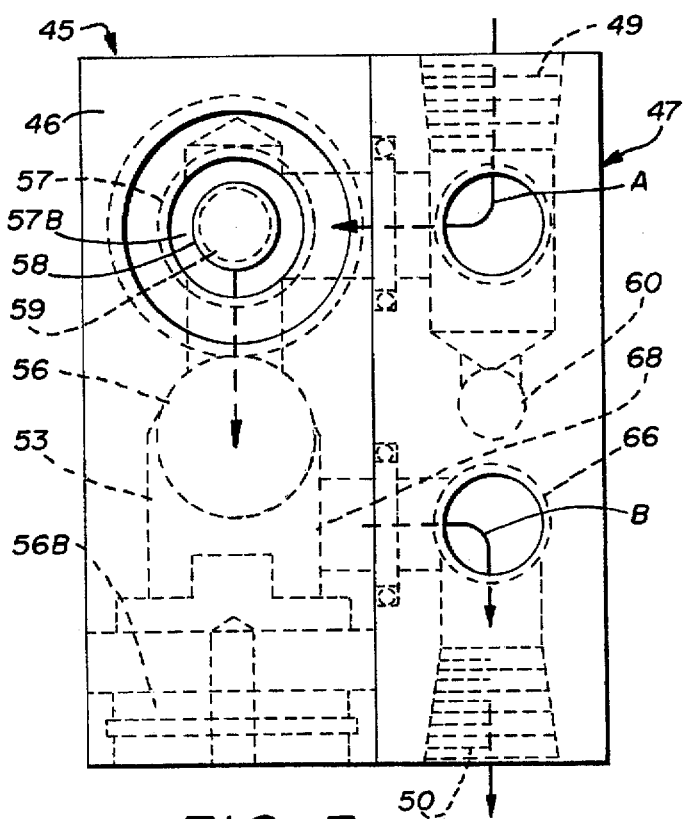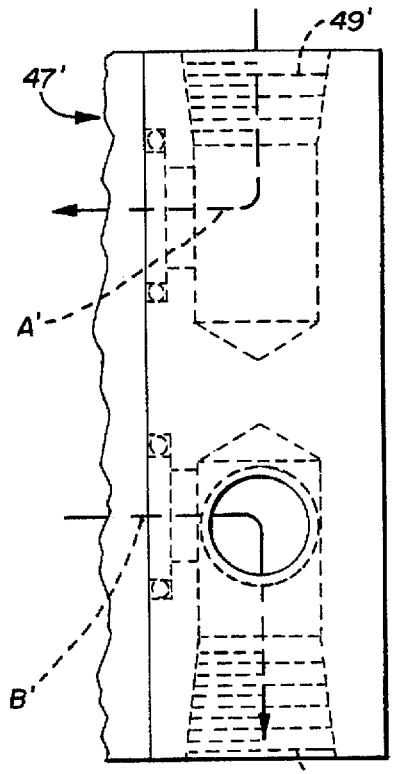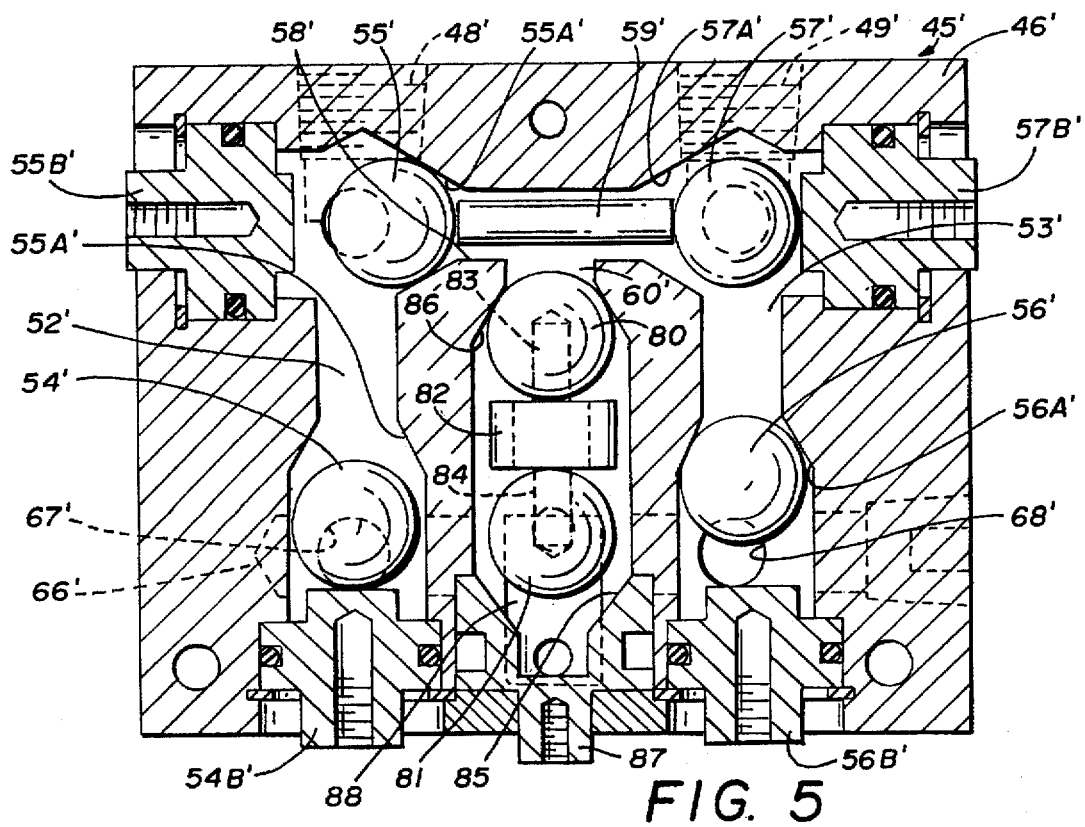

SHUT OFF VALVE SYSTEM FOR ROBOTIC WELDING DEVICES

BACKGROUND OF THE INVENTION

1. Technical Field

This invention relates to automatic shut-off valves for controlling coolant flow to multiple liquid cooled welding electrodes that are used in robotic welding applications and the like.

2. Description of Prior Art

Prior art devices of this type have relied on a variety of different structural configurations, see for example U.S. Pat. Nos. 1,775,773, 3,431,375 and applicant's own U.S. Pat. No. 4,650,152.

U.S. Pat. No. 1,775,773 is directed to a ball spring valve arrangement to move an operating rod upon loss of pressure. The operating rod activates an electric switch as illustrated.

U.S. Pat. No. 3,431,375 discloses a flow monitoring device that incorporates a valve with a bi-pass around the valve and a piston movable in the bi-pass for magnetically actuating a pressure indicating gauge. The valve comprises a valve element having a valve stem which may be adjustably positioned with respect to the valve seat.

In applicant's U.S. Pat. No. 4,650,152 a pressure loss activation valve is disclosed that can manually or automatically shut-off coolant flow in the system using a pair of ball check valves, one of which is held in open position by a pressure balanced spring and piston assembly responsive to fluctuations in coolant line pressure.

SUMMARY OF THE INVENTION

A valving and sensing system that responds to pressure loss in its present embodiment to cut off coolant flow and return to a failure in a coolant line supporting hollow electrodes and other welding system components that must be fluidly cooled during operation. The sensing and control system of the invention automatically maintains and responds to systems failures allowing isolation of coolant lines and ease of replacement without increased loss of coolant.

DESCRIPTION OF THE DRAWINGS

FIG. 3 is a side elevation of the pressure sensor shown in FIG. 2;

FIG. 5 is a cross-sectional view of an alternate pressure sensor and valving device;

FIG. 7 is a side elevation of the pressure sensor shown in FIG. 2.

DESCRIPTION OF THE PREFERRED EMBODIMENT

Figure 1:
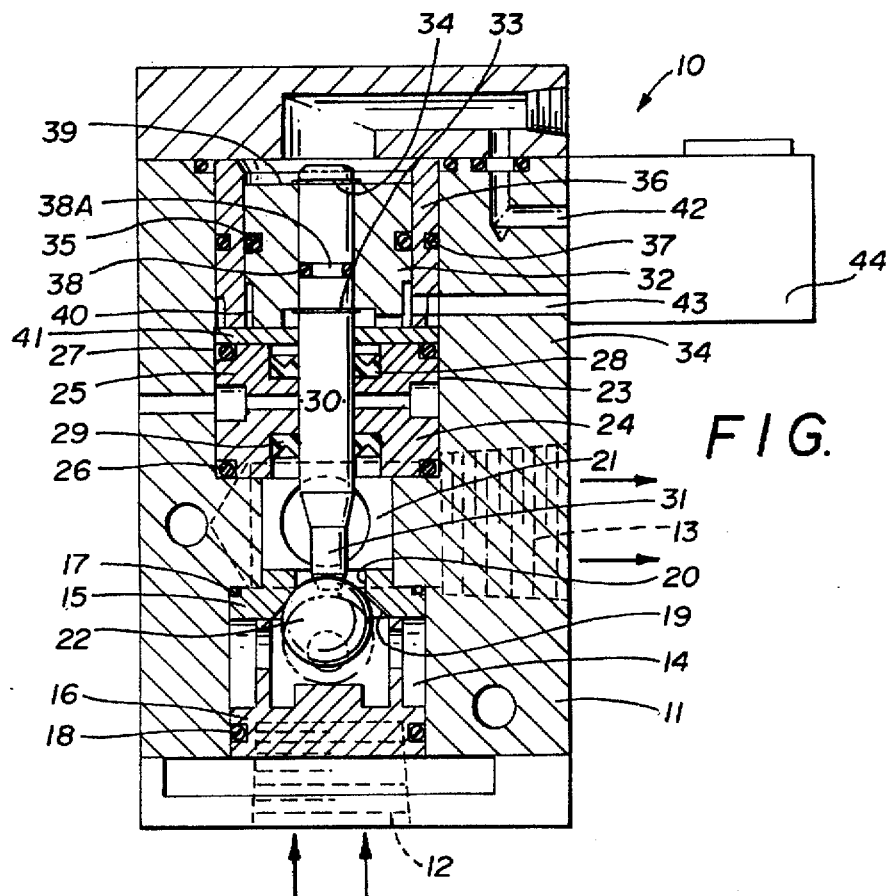
FIG. 1 is a vertical cross-sectional view of the automatic shut-off valve of the invention.

Referring to FIG. 1 of the drawings, a shut-off valve 10 can be seen having a valve body 11 with a coolant inlet port 12 and an outlet port 13 therein for a source of coolant under pressure. The inlet port 12 communicates with a first chamber 14 having a pair of oppositely disposed cage inserts 15 and 16 in its upper and lower portions respectively. The caged inserts 15 and 16 are positioned in sealing relation therein by respective O-rings 17 and 18. The cage insert 15 has a valve seat 19 defining a passageway 20 which communicates with a second chamber 21 and the outlet port 13 therein. A ball valve element 22 is positioned within the first chamber 14 in movable relationship to the valve seat 19 between the cage inserts 15 and 16.

A third chamber 23 extends in communication with the second chamber 21 upwardly through the valve body 11. A pair of apertured shaft supporting fittings 24 and 25 are positioned in sealing relation within the third chamber 23 by a pair of O-rings 26 and 27 respectively. Resilient seals 28 and 29 in the fittings 24 and 25 engage a shaft 30 positioned for vertical movement in the second chamber 21. The shaft 30 has a lowermost portion of reduced diameter at 31 that is engageable on the ball valve element 22 moving it away from the valve seat 19 when the shaft 30 is moved downwardly by pneumatic pressure against a piston 32 secured to the shaft 30 by a pair of snap rings 33 and 34. The piston 32 is movably positioned in sealing relation within the third chamber 23 by an O-ring 35 against a teflon support sleeve 36 in sealing relation against the valve body 11 of the third chamber 23 by an O-ring 37 providing a seal between upper and lower surfaces 39 and 40 of the piston 32.

The piston 32 is hollow having an inner diameter larger than the diameter of the shaft 30 that extends therethrough. An O-ring 38 in a groove 38A in the shaft 29 provides resilient seal therebetween.

A separation element 41 divides the third chamber with the piston 32 movably positioned in the upper portion forming a piston and cylinder therein.

A pair of piston control ports 42 and 43 in the valve body member 11 are in communication with the respective upper and lower piston surfaces 39 and 40 and a pressure source.

In operation, with fluid under pressure in the inlet port 12 and the first chamber 14, the ball valve element 22 can be moved away from the valve seat 18 by the engagement of the shaft 30. The inlet fluid will pass through the passageway 20 into chamber 21 and out through the outlet port 13.

To achieve closure of the shut-off valve a four-way air valve 44 in connection with the respective ports 42 and 43 upon activation will vent fluid under pressure therethrough from the upper surface 39 of the piston 32 allowing the ball valve 22 to be seated against the valve seat 19 by the force of the fluid pressure in the inlet port 12 retracting the shaft 30 and attached piston 32 as will be well known to those skilled in the art.

Figure 2:
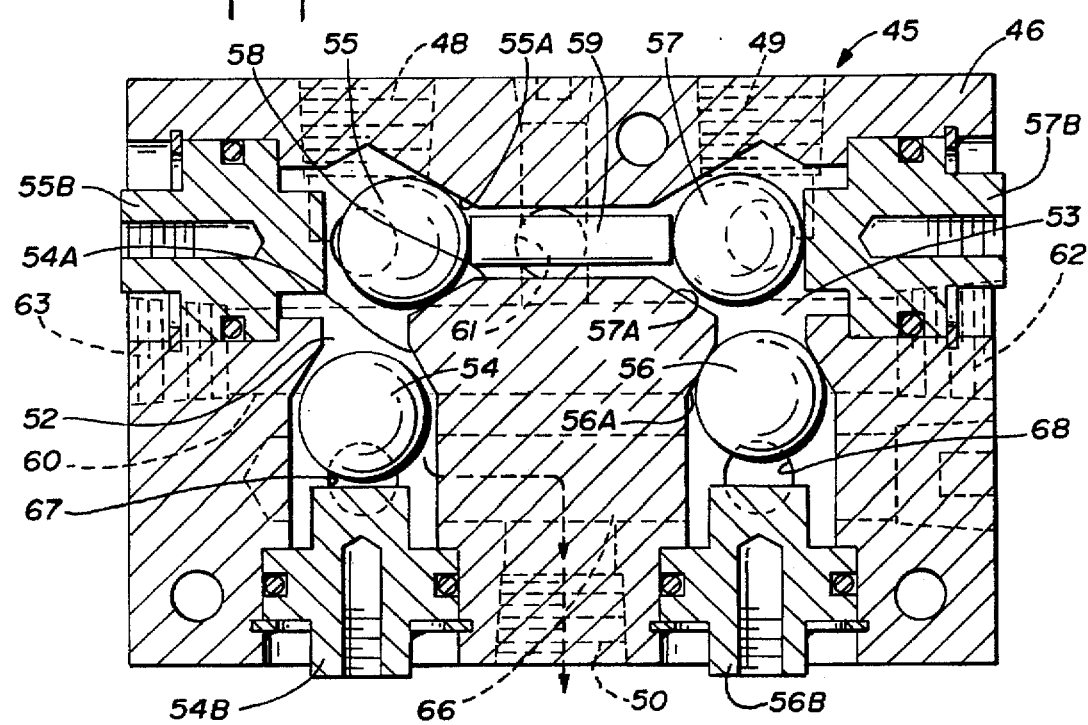
FIG. 2 is a cross-sectional view of a pressure sensor and valving assembly.

Referring now to FIGS. 2 and 3 of the drawings, a pressure sensor 45 can be seen having a main valve body member 46 and an interconnected supply manifold 47 having fluid inlet ports 48 and 49 and a single outlet port 50. The inlet and outlet ports are connected to respective valve pressure chambers 52 and 53 to define a directional flow path best illustrated in FIG. 3 of the drawings by directional flow arrows A and B.

Each of the valve pressure chambers 52 and 53 have a pair of ball valve elements 54 and 55 and 56 and 57 respectively. The ball valve elements 54 and 55 are positioned within the chamber 52 and movable relationship to respective valve seats 54A and 55A by cage insert plugs 54B and 55B. Conversely, the respective ball valve elements 56 and 57 are positioned within the chamber 53 in movable relation with respective valve seats 56A and 57A by cage insert plugs 56B and 57B as will be well understood by those skilled in the art.

The valve chambers 52 and 53 are interconnected by a passageway 58 between the valve seats 55A and 57A. A control rod 59 movably positioned within the passageway 58 is selectively engaged by the ball valve elements 55 and 57 dependent on input pressure variations as will be described in detail hereinafter.

A control passageway 60 shown in dotted lines communicates with said passageway 58 at an opening 61.

Figure 4:
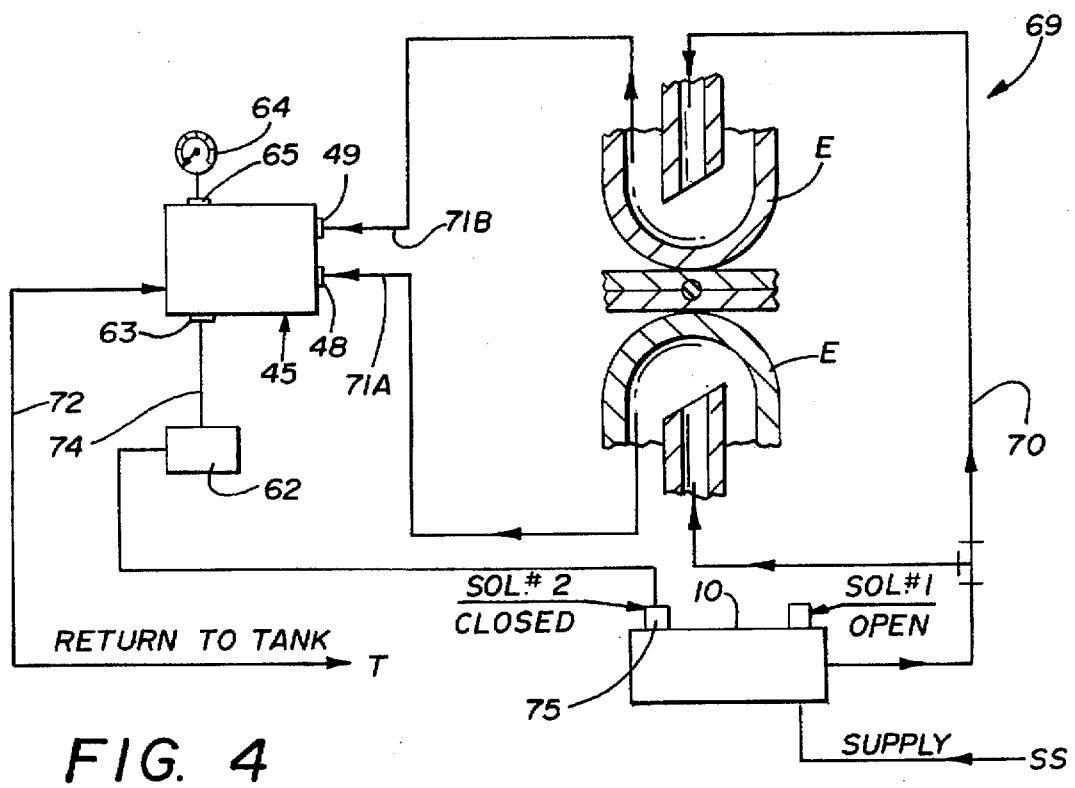
FIG. 4 is a diagrammatical illustration incorporating the shut-off valve and pressure sensor with coolant lines and a pair of hollow electrodes in a welding gun application cooling system.

A pressure switch 62 is connected to an outlet port 63 and a pressure gauge 64 is connected to an outlet port 65 of the passageway 58 as best seen and illustrated in FIG. 4 of the drawings.

The return outlet port 50 interconnects with the respective chambers 52 and 53 by a bifurcated return outlet passageway 66 therebetween with inlets at 67 and 68 respectively adjacent the corresponding ball valve elements 54 and 56.

Referring now to FIG. 4 of the drawings, a coolant circuit 69 is illustrated with hollow welding electrodes E interconnected to a cooling supply line 70 with a shut-off valve 10 of the invention and source of coolant SS.

Return coolant lines 71A and 71B from the hollow welding electrodes E interconnect to the return inlet ports 48 and 49 in the manifold 47 of the pressure sensor 45 with a coolant return line 72 extending back to a return tank T.

The pressure switch 62 is connected to the outlet port 63 by pressure line 74. The pressure switch 62 electrically connects to a control solenoid 75 on the shut-off valve 10.

In operation, upon drop of pressure in the return lines 71B indicating a failure in the coolant circuit, the ball valve 56, see FIG. 2 seats and simultaneously the ball valve 55 seats engaging the rod 59 isolating the return lines 72 and 71 from the failure.

The internal pressure drop in the chamber 53 activates the pressure sensor 62 tripping the control solenoid 75 on the shut-off valve 10, see FIG. 1 of the drawings. This action thus activates the four-way air valve 44 allowing the piston 32 and connected shaft 30 to disengage the ball valve 22 which seats by inlet coolant pressure shutting off coolant supply SS to the system without substantial loss of coolant.

This loss of pressure within the chamber 53 is simultaneously registered by the pressure gauge 64 as hereinbefore described.

Referring now to FIGS. 5 and 7 of the drawings, an alternate pressure sensor 45' can be seen having a main valve body member 46' and an interconnected supply manifold 47' having fluid inlet ports 48' and 49' and a single outlet port 50'. The inlet and outlet ports are connected to respective valve pressure chambers 52' and 53' to define a directional flow path best illustrated in FIG. 7 of the drawings by directional flow arrows A' and B'.

Each of the valve pressure chambers 52' and 53' have a pair of ball valve elements 54' and 55' and 56' and 57' respectively. The ball valve elements 54' and 55' are positioned within the chamber 52' in movable relationship to respective valve seats 54A' and 55A' by cage insert plugs 54B' and 55B'. Conversely, the respective ball valve elements 56' and 57' are positioned within the chamber 53' in movable relation with respect to valve seats 56A' and 57A' by cage insert plugs 56B' and 57B' as will be well understood by those skilled in the art.

The valve chambers 52' and 53' are interconnected by a passageway 58' between the valve seats 55A' and 57A'. A control rod 59' is movably positioned within the passageway 58' and is selectively engaged by the ball valve elements 55' and 57' dependent on input pressure variations as will be described in detail hereinafter.

A control chamber 60' communicates with said passageway 58'. Within the control chamber 60' are a pair of ball valve elements 80 and 81 that are interconnected to one another by a switch position element 82 having oppositely disposed threaded engagement studs 83 and 84 secured in respective ball valve elements 80 and 81.

The interconnected ball valve elements and switch position element 82 are movably positioned within the control chamber 60' and movable relationship with respect to valve seats 85 and 86 by an insert 87 as will be well understood by those skilled in the art.

The valve chamber 60' is interconnected to a bifurcated return outlet passageway 66' by a passageway 88 shown in dotted lines in FIG. 7 of the drawings. The return outlet port 50' is interconnected with the chambers 52' and 53' by the passageway 66' within inlets 67' and 68' respectively the ball valve elements 54' and 56'.

Figure 6:
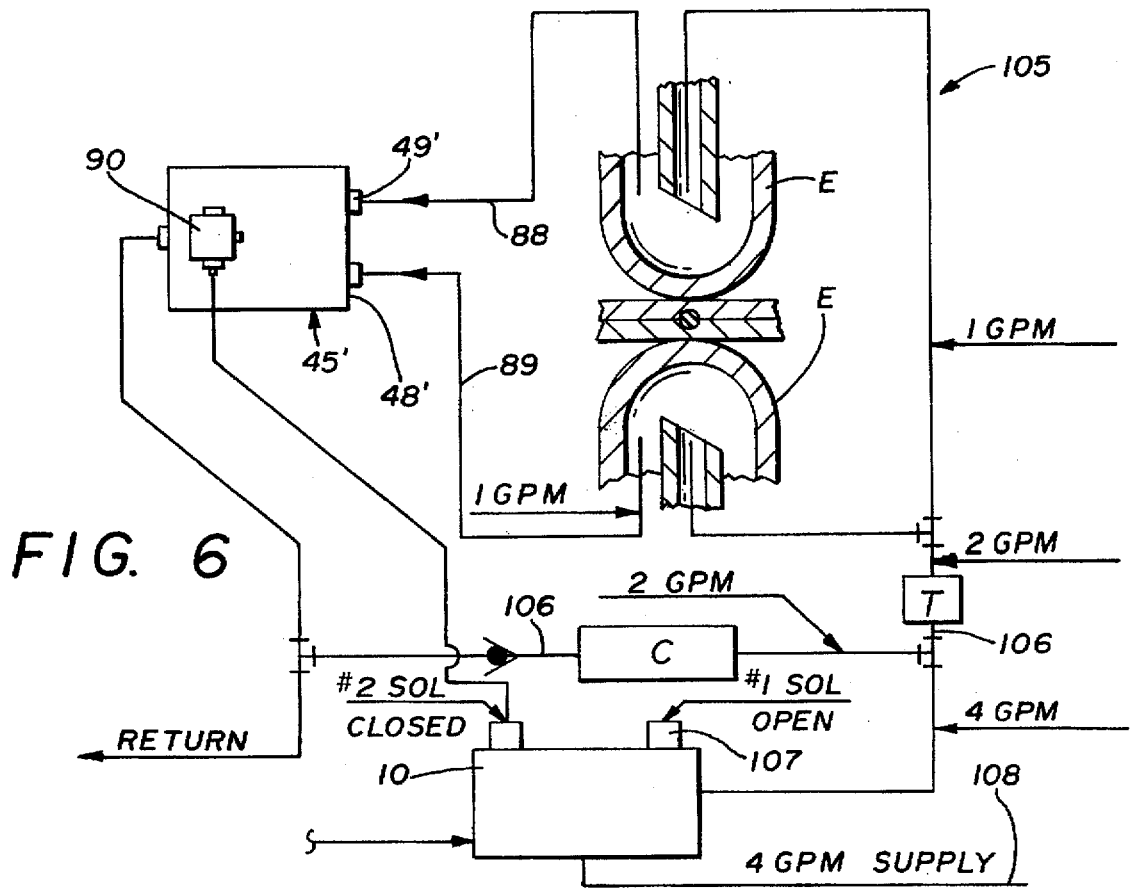
FIG. 6 is a diagrammatical illustration incorporating the shut-off valve, and alternate pressure sensor with coolant lines and hollow electrodes in a welding gun and associated support elements.

Referring now to FIG. 6 of the drawings an alternate cooling circuit 105 is illustrated interconnected to the alternate pressure sensor 45' by return coolant lines 88 and 89. A proximity switch 90 is positioned on the valve body 46' so as to interact with the hereinbefore described position element 82 within the valve chamber 60'.

The coolant circuit 105 is illustrated with hollow welding electrodes E' interconnected to a coolant supply line 106 with the shut-off valve 10 of the invention and a source of coolant supply at 108.

In operation upon loss of coolant pressure in the return line 88 as illustrated, the alternate pressure sensor 45' reacts in the same manner as hereinbefore disclosed sensor 45 except that the interconnected ball valve element in the valve chamber 60' is sealingly positioned against the valve seat 86 by the coolant pressure maintained within the isolated chamber 56' and interconnecting passageway 66' with the outlet port 50'.

The repositioning of the ball valve elements 80 and 81 and connected position element 82 within the valve chamber 60' is detected by the proximity switch 90 tripping the control sensor 75 on the shut-off valve 10 activating a coolant system shut-down without excess loss of coolant as hereinbefore described.

It will be apparent that the coolant circuit 105 disclosed in FIG. 6 also has coolant lines 106 for a transformer T and cable bundle C with associated check valves which require a specific gallons per minute (GPM) of cooling flow rates indicated to be selective along supply cooling line 106 in FIG. 6 of the drawings as will be understood by those skilled in the art.

Referring back now to FIG. 4 of the drawings it will be seen that to restore coolant flow through the coolant circuits 69 and 105 an (open) solenoid 107 is activated re-establishing the open control valve 10 position as shown in broken lines in FIG. 1 by supplying compressed air to the top 39 of the piston 32 moving the shaft 30 downwardly against the ball valve 22 allowing coolant to flow again from an air source not shown.

It will thus be seen that the automatic shut-off valve of the invention will remain remediably responsive to a loss of fluid pressure in the fluid control circuits by detection and activation of the pressure sensor 45 as illustrated in FIG. 2 of the drawings or alternately in response to a drop of fluid pressure in the coolant pressure sensor 80 and thus provide the desirable protection of a multiplicity of hollow welding electrodes in welding environment such as a robotic installation in a manufacturing assembly line wherein many of the electrodes are so positioned during the work cycle that visual observation of the condition is very difficult.

Having thus described my invention, what I claim is:

1. A valving and sensing system responsive to variations in pressure in a coolant circulating system including a source of fluid under pressure, said valving and sensing system comprise; a shut-off valve, and a pressure sensor valve, said shut-off valve comprising a valve body having a bore therethrough, inlet and outlet ports communicating with said bore, a valve seat in said bore between said inlet and outlet ports and a valve element in said bore downstream of said valve seat movable towards and away from said valve seat, a piston in said bore upstream of said valve seat, means for selectively supplying fluid under pressure to said piston, a shaft movably positioned axially of said seat, means in said piston frictionally engaging said shaft, one of said shaft positions for movement through said valve seat against said valve element to move same downstream of said valve seat, said pressure sensor valve comprising a main body member having multiple inlet ports and outlet ports in communication with a pair of interconnected chambers, valve seats in each of said chambers between said inlet and outlet ports, valve elements in said chambers movable towards and away from said valve seats, means for positioning said valve elements in said chambers, a passageway between said valve seats of said respective chambers, means for interengaging said valve elements of said interconnected chambers and means for communication between said passageway and some of said outlet ports and said control means on said shut-off valves.

2. The valving and sensing system of claim 1 wherein said means for selectively supplying fluid under pressure to said piston comprises an air valve.

3. The valving and sensing system of claim 1 wherein said means for interengaging said valve elements of said interconnected chambers comprises a control rod movably positioned within said interconnecting passageway between said valve seats.

4. The valving and sensing system of claim 1 wherein said means for communication between said passageway and said outlet ports comprises a control passageway.

5. The valving and sensing system of claims 1 or 4 wherein said means for controlling said shut-off valve comprises a pressure switch in communication with one of said outlet ports on said control passageway.

6. The valving and sensing system of claim 1 wherein said means in said piston frictionally engaging said shaft comprises snap rings therebetween.

7. The valving and sensing system of claim 1 wherein said bores are vertically disposed in said valve body defining upper and lower chambers and said inlet port comprises the lower chamber and said valve seat is located inwardly thereof and wherein said outlet port is horizontally disposed in said valve body and communicates with said upper chamber above said valve seat and below said piston.

8. The shut-off valve set forth in claims 1, 2, or 7 and wherein said piston is positioned in said bore above said upper fittings therein defining a cylinder housing having a secondary inlet and outlet in communication with said air valve and a source of fluid under pressure.

9. The valving and sensing system in a coolant circulating system of claim 1 wherein said coolant circulating system comprises the source of coolant under pressure, the shut-off valve, hollow electric welding elements interconnected to the shut-off valve and said pressure sensor valve, a return cooling line from said pressure sensor valve, an electronic interconnecting between said pressure sensor valve and said shut-off valve.

10. A valving and sensing system responsive to variations in pressure and a coolant circulation system including a source of fluid coolant under pressure and a shut-off valve further comprising; a pressure sensor valve defining a main body member having inlet and outlet ports in communication with interconnected chambers, valve seats in each of said chambers between said inlet and outlet ports, valve elements in said chambers movable towards and away from said valve seats, means for positioning said valve elements in said chambers, a passageway between said valve seats and said chambers, means in said passageway for interengaging said valve elements of said interconnected chamber, a position indicator interengaging said valve elements in one of said chambers, means for remotely detecting the relative position of said position indicator within said chamber, means for interconnecting said chamber to said outlet port.

11. The valving and sensing system of claim 10 wherein said means in said passageway for interengaging said valve elements comprises a control rod movably positioned therein.

12. The valving and sensing system of claim 10 wherein said position indicator is between said respective valve elements in one of said chambers.

13. The valving and sensing system of claim 10 wherein said means for interconnecting said chambers and said outlet port comprises a return outlet passageway.

14. The valving and sensing system of claim 10 wherein said means for detecting said position of said position indicator within said chamber comprises a proximity switch.

15. The valving and sensing system of claim 10 wherein said coolant circulation system comprises; the source of coolant under pressure, the shut-off valve, hollow electrode welding elements interconnected to the shut-off valve and said pressure sensor valve, a return cooling line from said pressure sensor valve, and an electric interconnection between said proximity switch and said shut-off valve.

\* \* \* \* \*